(12) United States Patent
Harris

(10) Patent No.: US 8,537,073 B1
(45) Date of Patent: *Sep. 17, 2013

(54) AUTOMATIC CONFIGURATION OF MULTIPLE MONITOR SYSTEMS

(71) Applicant: Scott C. Harris, Rancho Santa Fe, CA (US)

(72) Inventor: Scott C. Harris, Rancho Santa Fe, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/758,948

(22) Filed: Feb. 4, 2013

Related U.S. Application Data

(63) Continuation of application No. 13/540,798, filed on Jul. 3, 2012, now Pat. No. 8,368,616, which is a continuation of application No. 11/775,868, filed on Jul. 11, 2007, now Pat. No. 8,212,740, which is a continuation of application No. 09/569,816, filed on May 12, 2000, now Pat. No. 8,089,423.

(51) Int. Cl.
G09G 5/00 (2006.01)
G06F 3/00 (2006.01)
G06F 3/048 (2013.01)

(52) U.S. Cl.
USPC ............... 345/1.1; 345/1.2; 345/1.3; 345/2.1; 345/2.2; 345/3.1; 345/3.2; 345/3.3; 715/751; 715/752; 715/753; 715/754; 715/755; 715/756; 715/757; 715/758; 715/759; 715/761; 715/778

(58) Field of Classification Search
USPC ............... 345/1.1, 1.2, 1.3, 2.1, 2.2, 3.1, 3.2, 345/3.3, 3.4; 715/751, 752, 753, 754, 755, 715/756, 757, 758, 759, 761, 778
See application file for complete search history.

(56) References Cited

U.S. PATENT DOCUMENTS

| | | |
|---|---|---|
| 4,566,004 A | 1/1986 | Emerson |
| 4,933,885 A | 6/1990 | Kato et al. |
| 5,179,648 A | 1/1993 | Hauck |
| 5,283,856 A | 2/1994 | Gross et al. |
| 5,307,055 A | 4/1994 | Baskin et al. |
| 5,315,697 A | 5/1994 | Nagamatsu |
| 5,481,735 A | 1/1996 | Mortensen et al. |
| 5,530,865 A | 6/1996 | Owens et al. |
| 5,682,486 A | 10/1997 | Grossman et al. |
| 5,682,529 A | 10/1997 | Hendry et al. |
| 5,694,141 A | 12/1997 | Chee |
| 5,694,150 A | 12/1997 | Sigona et al. |
| 5,727,155 A | 3/1998 | Dawson |
| 5,745,109 A | 4/1998 | Nakano et al. |
| 5,757,371 A | 5/1998 | Oran et al. |
| 5,760,776 A | 6/1998 | McGurrin et al. |
| 5,796,397 A | 8/1998 | Kusano |

(Continued)

FOREIGN PATENT DOCUMENTS

JP  0822436 A  1/1996

OTHER PUBLICATIONS

Harris, "Unofficial Dreamcasl FAQ" Feb. 2000.

(Continued)

*Primary Examiner* — Jeffrey Chow
(74) *Attorney, Agent, or Firm* — Law Office of Scott C. Harris, Inc.

(57) ABSTRACT

Control of multiple display screens associated with a computer, wherein the auxiliary screen display content that depends on conditions of the computer. During some times the auxiliary screen displays content associated with the presently executing program, and during other times the auxiliary screen displays history information. The rules can be automatically changed or manually changed.

19 Claims, 5 Drawing Sheets

(56) References Cited

U.S. PATENT DOCUMENTS

| | | |
|---|---|---|
| 5,835,090 A | 11/1998 | Clark et al. |
| 5,889,517 A | 3/1999 | Ueda et al. |
| 5,923,307 A | 7/1999 | Hogle, IV |
| 5,987,345 A | 11/1999 | Engelmann et al. |
| 5,995,085 A | 11/1999 | Bowen |
| 5,999,177 A | 12/1999 | Martinez |
| 6,002,395 A | 12/1999 | Wagner et al. |
| 6,006,225 A | 12/1999 | Bowman et al. |
| 6,018,340 A | 1/2000 | Butler et al. |
| 6,043,817 A | 3/2000 | Bolnick |
| 6,099,317 A | 8/2000 | Bullwinkel et al. |
| 6,104,359 A | 8/2000 | Endres et al. |
| 6,144,358 A | 11/2000 | Narayanaswamy et al. |
| 6,191,758 B1 | 2/2001 | Lee |
| 6,297,817 B1 | 10/2001 | Larson et al. |
| 6,310,655 B1 | 10/2001 | Godwin |
| 6,331,840 B1 | 12/2001 | Nielson et al. |
| 6,338,004 B1 | 1/2002 | Usui |
| 6,456,304 B1 | 9/2002 | Angiulo et al. |
| 6,476,832 B1 | 11/2002 | Park |
| 6,522,309 B1 | 2/2003 | Weber |
| 6,587,082 B1 | 7/2003 | Moore |
| 6,728,680 B1 | 4/2004 | Aaron et al. |
| 6,859,219 B1 | 2/2005 | Sall |
| 6,971,109 B1 | 11/2005 | Williams et al. |
| 6,982,682 B1 | 1/2006 | Kaulgud et al. |
| 7,007,240 B1 | 2/2006 | Anderson et al. |
| 7,030,837 B1 | 4/2006 | Vong et al. |
| 7,032,172 B1 | 4/2006 | Lee et al. |
| 7,554,510 B1 | 6/2009 | Grigor et al. |
| 2005/0149879 A1 | 7/2005 | Jobs et al. |

OTHER PUBLICATIONS

Levine et al., "The Complete Reference: Windows 98" McGraw-Hill, 1998.

Dreamcast, "Screen Shot of Biohazard 2 Value Plus Game" game, Capcom, 1999.

Dreamcast, Resident Evil 2 manual, Capcom 2000.

Dreamcast, Visual memory Unit Instruction Manual, Sega 1999.

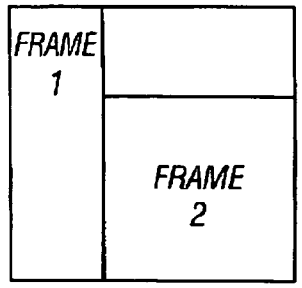
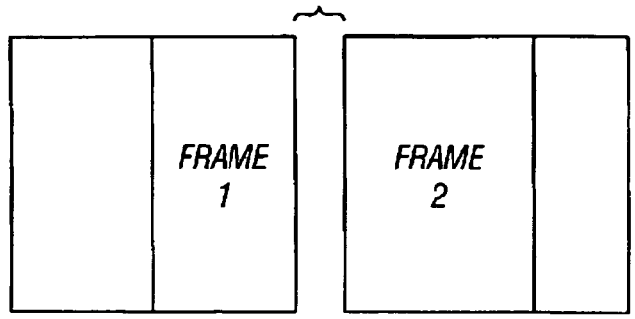
FIG. 6A   FIG. 6B
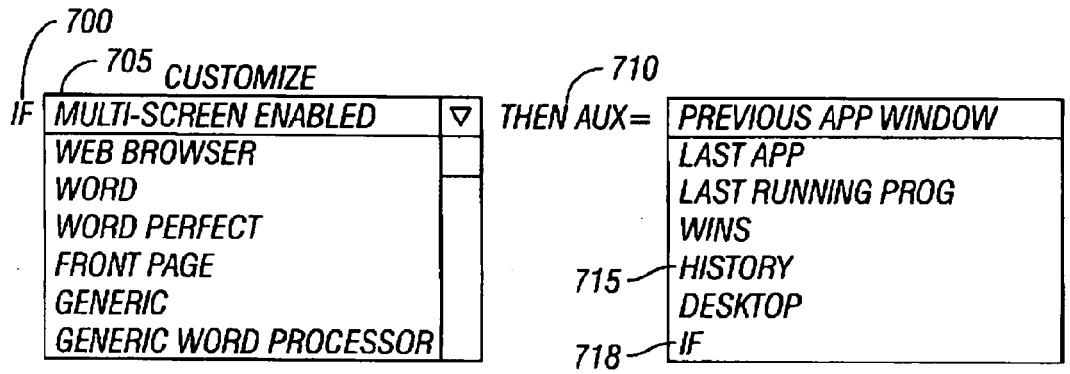
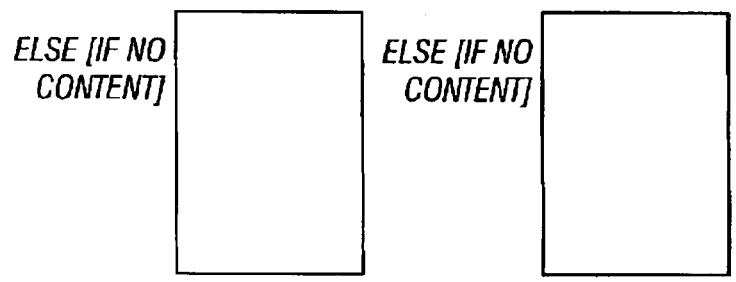
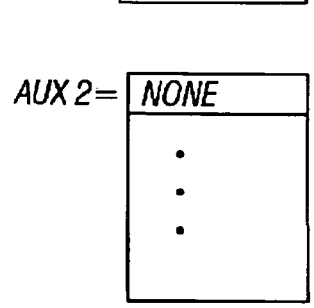
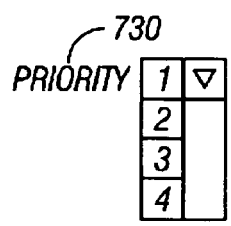
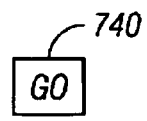
FIG. 7

AUTOMATIC CONFIGURATION OF MULTIPLE MONITOR SYSTEMS

CROSS REFERENCE TO RELATED APPLICATIONS

This application is a continuation of U.S. application Ser. No. 13/540,798 filed Jul. 3, 2012, which is a continuation of Ser. No. 11/775,868 filed Jul. 11, 2007, now U.S. Pat. No. 8,212,740 issued Jul. 3, 2012, which is a continuation of U.S. application Ser. No. 09/09/569,816, filed May 12, 2000, now U.S. Pat. No. 8,089,423 issued Jan. 3, 2012, the contents of each of which are incorporated by reference herein in their entireties.

BACKGROUND

Modern operating systems may allow operation with multiple display screens. Windows 98, for example, allows two different display cards to be used in the system, each display card running an associated display.

SUMMARY

The present application defines automatic arranging of the content on multiple display screens. The arranging is "intelligent" in the sense that the arrangement on the screens depends on environment and/or history in a way to provide meaningful content to the user. The content is variable depending on conditions. In an embodiment, the system learns preferences from previous operations. For example, rules can be applied based on a user's previous settings for a condition.

A specified condition can include its own set of rules.

BRIEF DESCRIPTION OF THE DRAWINGS

These and other aspects will now be described in detail with respect to the accompanying drawings, wherein:

FIGS. 6A-6B shows frames displayed in one or multiple screens;

FIG. 7 shows customization features; and

DETAILED DESCRIPTION

Figure 1A:
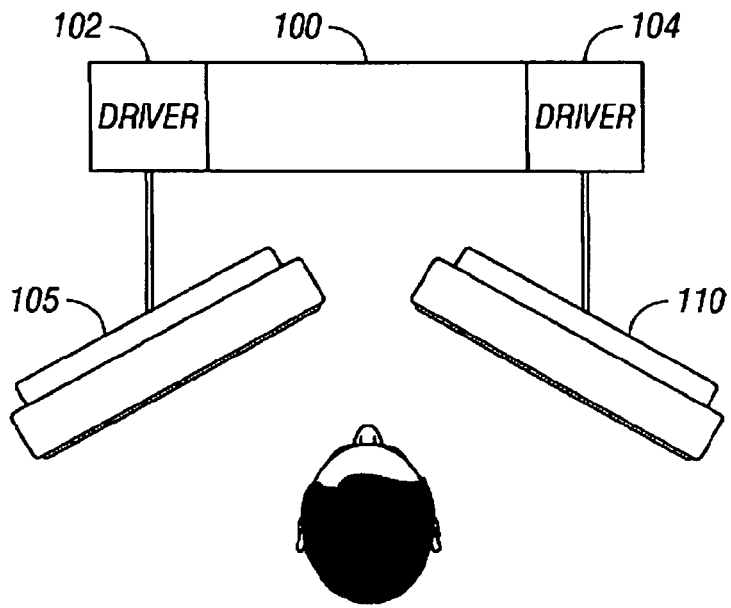
FIG. 1A shows a view of hardware in which a single computer includes two separate display screens.
Figure 1B:
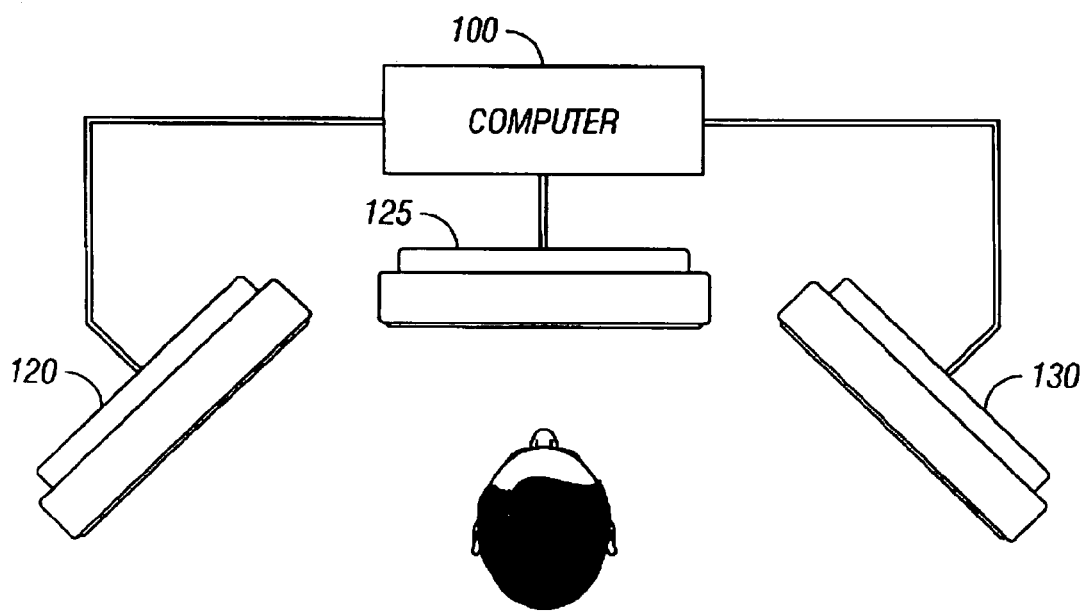
FIG. 1B shows hardware with three display screens.

FIGS. 1A and 1B show computer systems with multiple display screens. FIG. 1A has two separate computer screens 105, 110. The computer 100 can be a single-processor computer with two different display drivers 102, 104, driving the two different display screens 105, 110. The two display drivers can be part of the computer, or can be separate display cards. Alternately, the two display drivers can be on a single display card. Each display driver drives the separate display screen. The computer can also be a multiple processor computer. The operating system can assign threads to the two processors such that each one processor handles the display for a different one of the screens. This is most advantageously accomplished by including the display drivers on the motherboard itself. However, it can also be accomplished on the PCI bus, e.g. by using PCI bridges in which the PCI bus is periodically controlled by alternate processors. The operating system controls the two display devices according to the description given herein.

FIG. 1B shows an alternative layout, in which three screens 120, 125, 130 are driven by the computer 100. The screens are arranged with one screen flat in front of the user, and two others at angles to the user.

Figure 2:
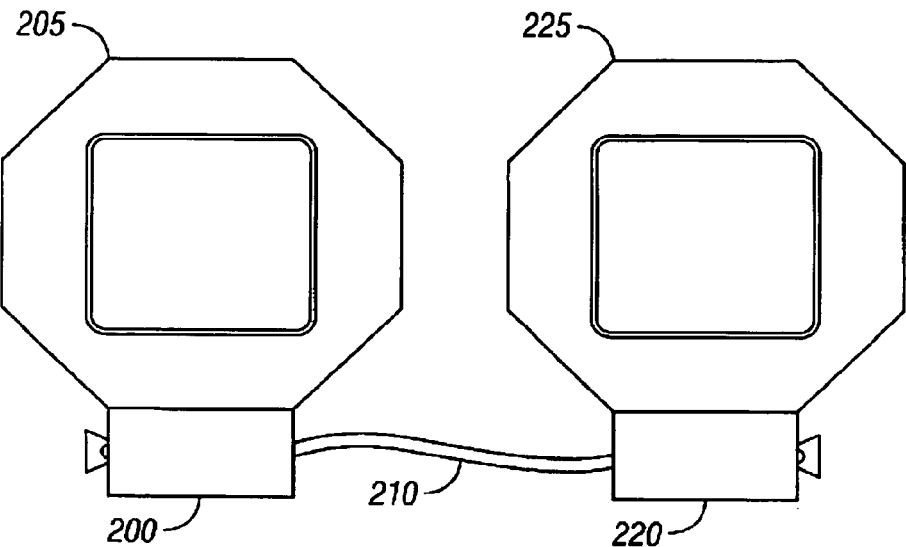
FIG. 2 shows a configuration in which a remote connection is used to form a multiple screen display system.

An alternative computer system with multiple display screens is shown in FIG. 2. In this system, the computer 200 with display 205 is connected over remote connection 210 to second computer 220 with its own display screen 225. The remote connection can be for example by Ethernet, by a fast Internet connection, or the like. The remote connection can also be a docking station, e.g. when one of the computers is a laptop and the other is a docking computer. The remote connection can also be by Bluetooth, Firewire USB or any other bi-directional communication system. The information to be displayed on the second computer is sent over the remote connection to the second computer. One additional advantage of this system is that the second computer can also have a sound card and all other peripherals. This enables even more information to be output, e.g. sound from two applications.

The present application is disclosed in the context of a Windows™ type operating system in which multiple windows of information can be open at once. Other operating systems can alternatively be used. The operating system controls the screens as described herein.

Figure 3:
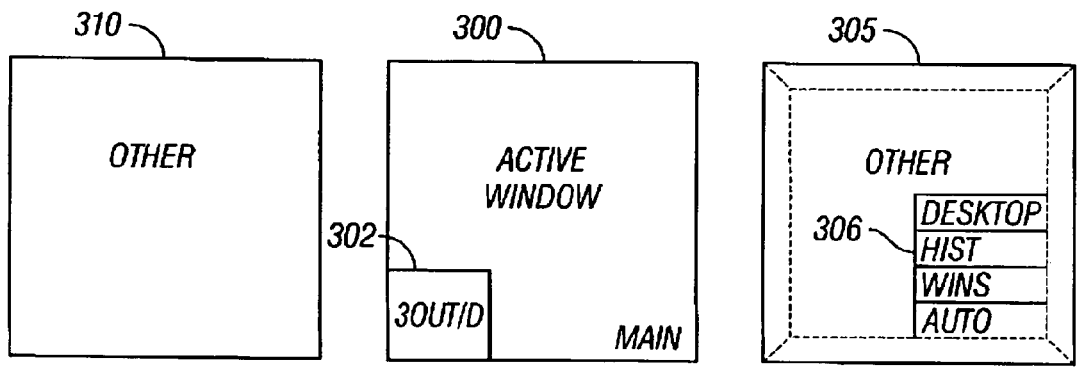
FIG. 3 shows multiple items of screen information.

FIG. 3 shows the screen information to be displayed on the screens. The control of the display is carried out by the operating system. A main screen 300 is shown in the middle with the auxiliary screen 305 shown on the right. A third screen 310 is shown on the left. This would advantageously place the main screen in the middle, with the auxiliary screens surrounding the main screen. A two screen environment, however, is contemplated.

The contents of the main screen is defined as usual—as the main or focus screen. The alternative screens 305 and 310 change content based on conditions. The conditions can include the software that is running and/or the software that has run in the past.

Screen 305 shows a content control menu 306. The AUTO setting is the default setting for the screen, but other options can be selected. The content control part can be caused to automatically hide when it is not being used. Placing the cursor over that spot thereafter causes the content control to reappear.

The "auto" setting operates according to a flowchart of preferences indicating the content that the alternative screens will display based on the computer's condition and a previous operation, the "history". The user can also select to override the automatic operation as disclosed herein. These preferences effectively form "rules".

Manual operations are also available.

Figure 4A:
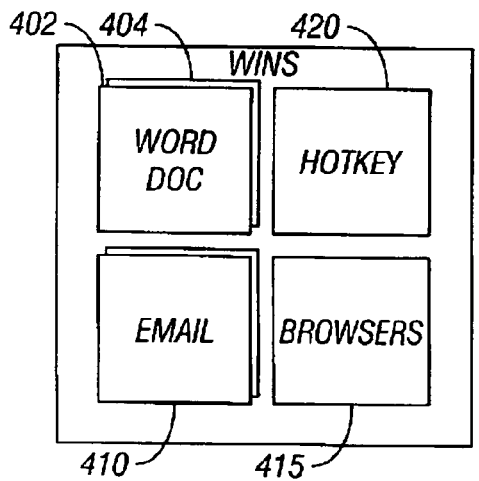
FIG. 4A-4B shows multiple items of screen information.

The WINS option causes the auxiliary screen to display reduced versions of all inactive windows as shown in FIG. 4A. FIG. 4A shows all of the currently active windows, including for example Word™ 402 showing a Word document. The most currently-obtained Word document is shown in front, with other Word documents 404 behind it.

Therefore, the current focus screen is shown in the main screen 300, while the auxiliary screen 305 shows the FIG. 4A view. FIG. 4A also shows the e-mail program 410, a web browser 415 and a hotkey area 420. The hotkey 420 can be a location which enables selection of specified programs which are assigned to the hotkey.

Figure 4B:
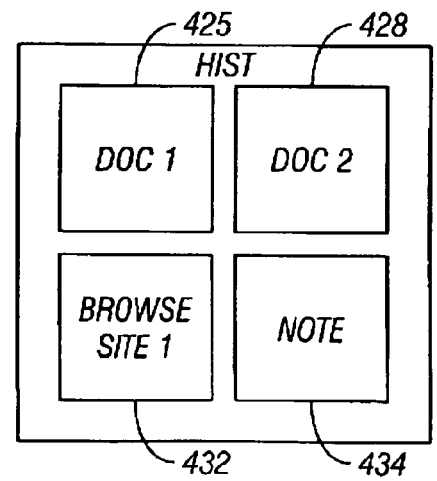

The HISTORY configuration is shown in FIG. 4B. The HISTORY alternative brings back a historical list of items, e.g. "documents" which were previously opened. While FIG. 4B shows only four such documents, it should be understood that miniaturized versions of many more documents could be provided. FIG. 4B shows the first item 425 being the last document that was opened. Prior to that, the user was editing a second document "doc 2" which is shown as 428. The browser 432 is shown browsing site no. 1, and 434 represents a notepad document for example.

Another alternative which can be selected is the desktop, in which the user always sees their DESKTOP in auxiliary screen 305. Other alternatives, not specifically disclosed herein, are also possible.

When the auto selection is selected, the operating system automatically selects which of the multiple modes will appear on the auxiliary screen. This automatic mode configures the auxiliary screen 305 to automatically provide content which is most likely to be the content that is most useful to the user under the conditions. The content can also be based on choices made by the user during a previous operation.

Figure 5:
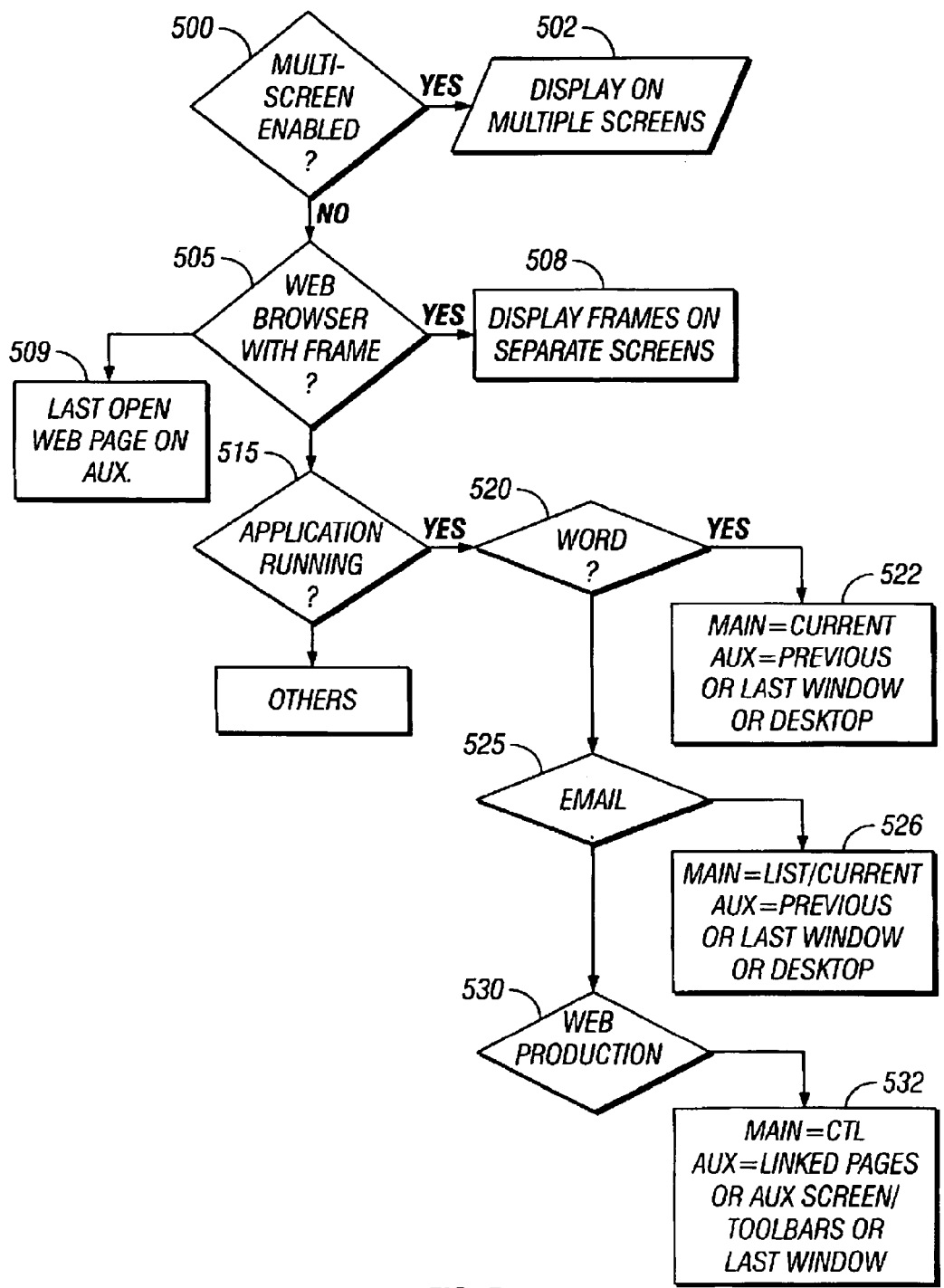
FIG. 5 shows a flowchart of preferences.

The operation progresses as shown in FIG. 5. This occurs according to a flowchart of preferences in which the system first determines various things about the operation and configures the screens accordingly.

At 500, the system first determines if the application is a type which can be displayed on multiple screens without adaptation, e.g. a multi-screen enabled game or application is displayed on the screens as described herein. If so, the content is displayed on the multiple screens at 502.

If 500 is negative, the operation moves to 505 which detects a web browser operation. If a browser is active at 505, the system first determines if the browser is reading a page which has multi screen-capable-frames. Multi-screen frames allow display in either one screen or multiple screens. FIG. 6A shows all of the frames are displayed on a single screen. FIG. 6B shows the same content when operating in a multi-screen paradigm at 508. Each frame can be displayed on a separate screen.

If the web browser detects that the current system is not a special multi-screen enabled frame, then the current page is simply displayed on the main screen 300, and the auxiliary screen 305 is then configured to receive the last web page that was opened at 509. In this way, the system displays the current page, and the last page. When the system is operating in this latter mode, it becomes possible to flip screens. Therefore, a special hotkey 392 is displayed on the main screen in an "always on top" mode. If this portion is actuated by a click, then the main and previous screens are switched. At 515, no browser has been detected, so the system determines if an application is running. Different applications are defined, for example in the windows registry. The present application discusses two such applications, a word processing program such as Microsoft Word, an e-mail program and a web page production program such as "Front Page". These different options are shown in steps 520, 525 and 530 respectively.

In the word processing program, the main screen displays the currently active document, while the auxiliary screen display previously opened documents at 522. The previous documents may be displayed in miniature form (like FIGS. 4A-4B), or may be displayed in full size. If no last document is available, that is if the word processing program is working on only one document, then the screen represents the last window. If no last window is available, then the screen shows the desktop.

Analogously, in an e-mail program at 525, the main screen showing the list of available e-mail or current open e-mails is first displayed. At this time, the auxiliary screen display, in order of preference, the last e-mail screen worked on, if not, the last window displayed, and if not the desktop at 525.

The development program, here a web page development program at 530, displays the main control and the main screen on the main screen 300 at 532. The auxiliary screen shows other web pages which are linked to the main web page. If no such pages have yet been formed, the auxiliary screens can show other hidden toolbars and help screens.

In this way, the user need not configure the multiple screens. Rather they are automatically configured for the user based on data about what the user might want.

While this system provides preferences, it should be understood that the user may have their own preference that differs from the presets. The system provides a customization feature. However, it is understood that real customization features are usually only fully utilized by so called power users. Therefore this system provides both a direct customization feature, and also a context-imitating customization feature. The real customization feature is shown in FIG. 7. In this Figure, the user can select and write "rules" for customizing the screen usage. For example, as shown, the "If" content at 700 has a pull down menu at 705 listing the different applications in the registry. The applications may include web browser, e-mail programs, word processing programs, and generic settings. More specific settings for different specific programs can include Word™, Outlook™ and the like. For each of these programs, the user can select various options from the "then" in 710. The current selection (e.g. the usual default) is shown in the pop-up list at 715. The default can be from any of the options discussed above or any other possible option. The "else" options specify what to do if the specified content is not available.

In addition, the rule-based interface enables different operations at different times. For example, as shown, the user can specify an additional "If" 718. For example, if more than four documents are open, then use the alternative screen in a different way than it would be used if 3 or fewer documents are open. A priority 730 is also set, to determine how to handle multiple rules. The priority sets the order of execution of the rules.

Figure 8:
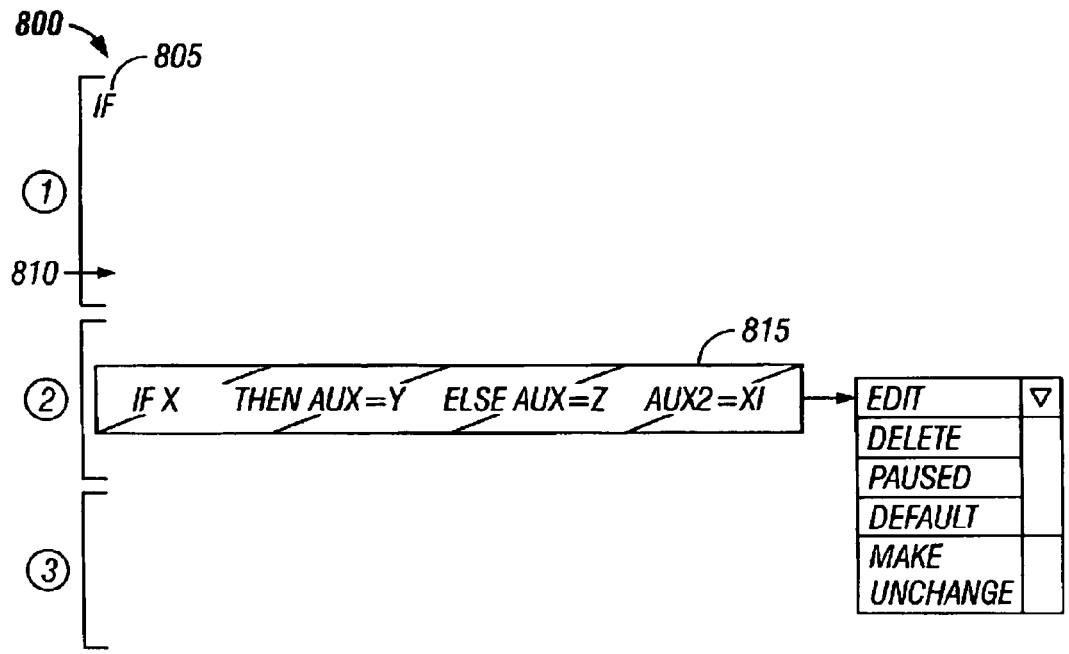
FIG. 8 shows the rules.

Each of these preferences is then compiled into a plurality of text-based rules shown in FIG. 8. The rules are of the general form if X, and Y, or Z (conditions), then alternative screen=option (results). These text based rules may be used directly as the rules for determining what to display on the extra screen, or alternatively they can be compiled into some machine readable form.

The rules are assembled based on their priority. Each time a rule is completed, the go button 740 is executed. This rule is then added to the end of the list for that priority assigned to that rule. For example, FIG. 8 shows the priority 1 rules 800 including rules 805 and like. If a new priority 1 rule is executed, that priority 1 rule is added to the end of the existing priority 1 rules at the location 810. Similarly, there is a location for priority 2 rules, priority 3 rules and the like. Any of the rules can be selected as shown in FIG. 8, selecting the rules 815. Once the rule 815 is selected, a menu is displayed including the ability to edit the rule or other operations which can occur on the rule. Editing the rule brings up the screen of FIG. 7, enabling the rule to be edited to change its priority, its actions, or any other part of the rule. The rule can also be deleted, paused or any other option. Another useful option is DEFAULT which sets this rule as the default rule for the "If" condition associated with that rule, and MAKE UNCHANGEABLE which prevents context automatic formation from changing the rule in the future.

The rules are shown above as editable using pull down boxes of alternatives. However, the rules can alternatively be plain text type rules, e.g., using Visual Basic or other comparable programming language. The rules can also be written as part of a registry file, e.g., the WINDOWS™ registry. Any form of rule which has conditions and results can be used.

Figure 9:
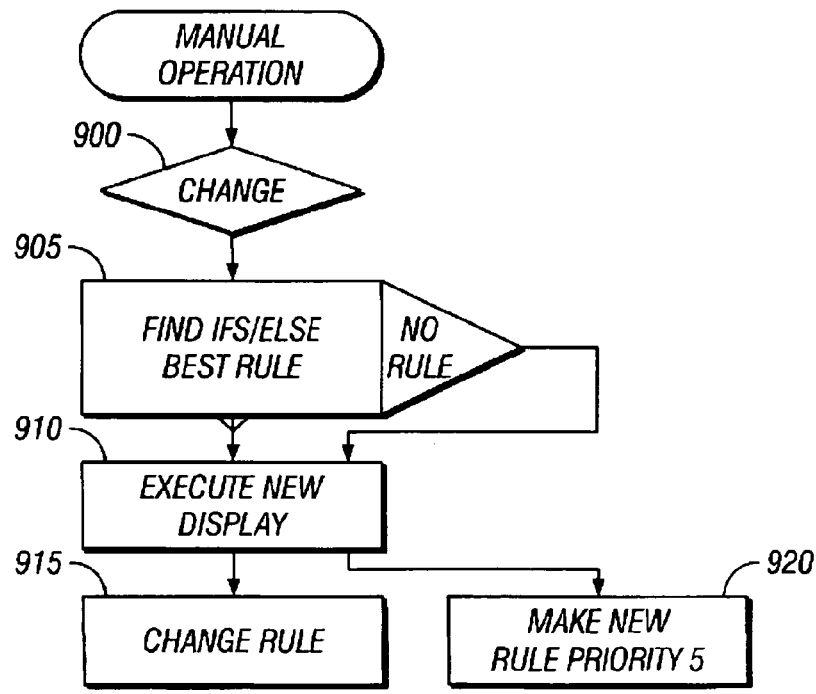
FIG. 9 shows a flowchart of manual operation.

In addition to the manual editing of the rules, the rules can be automatically formed and/or changed by context type automatic formation. Each time a window is displayed, the user has the capability to override the current contents of that window. This can be done using the menu 306, for example. The flowchart effecting that manual operation is shown in FIG. 9.

A change is detected at 900. Once the change is detected, the conditions of the change are detected at 905. That is, a currently running application is detected and all Ifs associated with that currently running application are pulled up. A determination is then made about whether the current condition represents the currently active condition associated with "Then", or one of auxiliary "Elses". At step 910, the system executes the new display condition. This is done by accepting the operation executed in the menu. At step 915 the rule is changed to indicate the new preferences. Of course, this possibility can be overridden. If no rule is found at 905, then a new rule of priority 5 is formed at 920.

Other modifications are contemplated. For example, other forms could be used to express the rules and the preferences. While this system is disclosed for use in editing rules for display, it should be understood that the selectable form of if-then-else that is described for setting preferences could be used for other preference setting operations, such as in the Windows registry or other comparable preference setting parts. All such modifications are intended to be encompassed within the following claims.

What is claimed is:

1. An apparatus comprising:
a first computer including a processor, a memory, at least one application running on the computer and an operating system running on the computer, a first display, and a first sound producing device;
a second computer having its own processor and memory, running applications, having a second display, and a second sound producing device;
said second computer connected to receive information from said first computer over a connection,
said operating system operating to automatically display content associated with a currently running program on said first display, and to send information over said connection to display content on said second display associated with said currently running program on said second display in a first mode of operation, and in a second mode of operation to automatically display, on said second display, second specified content associated with a previous history of said computer, previous to running said currently running program; and
wherein said memory in said first computer stores computer-based rules, which rules define that if a first condition occurs that indicates that the currently running program is capable of being displayed on multiple screens, then said first mode is established and outputs of said currently running program are displayed on both said first display and said second display, in a way that allows interacting with parts of said application that are displayed on said first display, and also interacting with parts of said application that are displayed on said second display,
and if a second condition occurs that indicates that the currently running application is not capable of being displayed on multiple screens, then said second mode is established and said second specified content is displayed on said second screen, where said second specified content is not information from the currently running program,
where said operating system operates said first and second modes according to computer-based rules, and allows a user to change content of the displays by a manual operation.

2. The apparatus as in claim 1, wherein said operating system programmed for and operating for automatically making new rules when the user changes a content of the screens for said manual operation.

3. The apparatus as in claim 1, wherein said rules specify a priority of which among said previously running programs is displayed on said second display.

4. An apparatus as in claim 1 wherein said second specified content on said second screen represents miniature versions of multiple different windows which are running on said computer, said multiple different windows that are displayed on said second screen being windows that represent only inactive windows other than an active window associated with said first screen.

5. A method, comprising:
detecting applications which are running on a computer;
using conditions, including both said applications which are running and preset preferences, to automatically control a content which is displayed on both a main screen and at least one auxiliary screen associated with the computer,
operating in a first mode in which content on the auxiliary screen includes content associated with said main screen and in which said content on said auxiliary screen is different than the content on the main screen, and
operating in a second mode in which said auxiliary screen includes content associated with a previous operation of the computer that is not connected with said content being displayed on said main screen,
said operating in said first or second mode depending on said conditions that includes both said applications which are running and said preset preferences; and
storing computer-based rules specifying said conditions, which rules define that if a first condition occurs, then a specified content should be displayed on the auxiliary screen, and using the computer to execute said rules to define said content for said auxiliary screen.

6. A method as in claim 5 wherein said defining computer based rules defines a plurality of computer-based rules having conditions and results, which rules define that if a first condition occurs, where said first condition is that a computer is currently executing an application that is multiple screen enabled and can display different information on different screens, then said application is displayed on both the main screen and on the auxiliary screen as first specified content, and that if a second condition occurs, where said second condition indicates that said application is not multiple screen enabled, then a second specified content, different than the first specified content, is displayed on said auxiliary screen, where the second specified content that is displayed when the second condition is present, is not associated with said application.

7. A method as in claim 5 wherein said preferences include a history content, which shows a previously running operation in the auxiliary screen which includes copies of all open but inactive windows other than said content on the main screen, said copies being reduced size copies.

8. A method as in claim 5, further comprising an operation which allows a user to override said preferences and define specific content to be displayed on both said main screen and said auxiliary screen.

9. The method as in claim 5, wherein said defining specific content automatically changes said rules to display said specific content on both said main screen and said auxiliary screen at time subsequent to the automatically changes.

10. A method as in claim 5 further comprising associating both said main screen and said auxiliary screen with a single computer.

11. A method as in claim 5 further comprising associating said main screen and said auxiliary screen with separate computers and connecting said computers by a computer connection protocol.

12. A computer system comprising:
a processor, running an operating system in which multiple programs are simultaneously open, each said program having information and producing output results when active,
said processor producing outputs that control both at least a main screen and an auxiliary screen, separate from the main screen;
said operating system controlling said multiple programs and defining a currently active program, according to a plurality of computer-based rules having conditions and results which rules define that if a first condition occurs, then said currently active program is automatically displayed on both the main screen and also on the auxiliary screen in a way that allows interacting with parts of said currently active program that are displayed on said main screen, and also interacting with parts of said currently active program that are displayed on said auxiliary screen,
where said first condition is that the currently active program is multiple screen enabled and can display different information on different screens including at least a main screen and an auxiliary screen,
said operating system controlling said multiple programs, according to said plurality of computer-based rules having conditions and results which rules define that if a second condition occurs, where said second condition indicates that said currently active program is not multiple screen enabled, then a second specified content, different than said currently active program is automatically displayed on said auxiliary screen, where the second specified content that is displayed when the second condition is determined, is not part of said currently active program; and
said computer operating to execute said computer-based rules to automatically determine the content of the auxiliary screen;
said computer allowing a user to change a content of the auxiliary screen; and
said computer automatically changing the rules when a user changes the content of the auxiliary screen such that subsequent operations after said user changing the content of the auxiliary screen use changed rules that take into account the user having changed the content of the auxiliary screen.

13. The computer system as in claim 12 wherein said second specified content includes content that is selected according to a hierarchy.

14. The computer system as in claim 13, wherein the changing of content on the auxiliary screen comprises putting content on the auxiliary screen which is different than that specified by the hierarchy, and the changed rules specify a new hierarchy based on the user having changed the hierarchy.

15. The computer system as in claim 14, wherein the hierarchy uses information indicative of which program was most recently run.

16. The computer system as in claim 14, wherein the hierarchy uses information indicative of how many instances of a program are running.

17. The computer system as in claim 12, wherein the computer detects whether a preference of said computer has been set to automatic or manual, and sets a content of the auxiliary screen dependent on said conditions if said preference is set to automatic, and
when said preference is set to automatic, using the computer-based rules to automatically determine the content on said auxiliary screen.

18. The computer system as in claim 12, wherein both said main screen and said auxiliary screen are connected to a single computer.

19. The computer system as in claim 12, wherein said main screen and said auxiliary screen are associated with separate computers and connected said computers by a computer connection protocol.

* * * * *